US008722229B2

(12) United States Patent
Haussmann (10) Patent No.: US 8,722,229 B2
(45) Date of Patent: May 13, 2014

(54) POWER TRAIN BATTERY ASSEMBLY OF AN ELECTRIC, FUEL-CELL OR HYBRID VEHICLE (75) Inventor: Roland Haussmann, Wiesloch (DE)

(73) Assignee: Valeo Klimasysteme GmbH, Bad Rodach (DE)

( * ) Notice: Subject to any disclaimer, the term of this patent is extended or adjusted under 35 U.S.C. 154(b) by 799 days.

(21) Appl. No.: 12/370,664

(22) Filed: Feb. 13, 2009

(65) Prior Publication Data

US 2009/0214940 A1 Aug. 27, 2009

(30) Foreign Application Priority Data

Feb. 14, 2008 (DE) .......................... 10 2008 009 041

(51) Int. Cl.
*H01M 10/50* (2006.01)
*H01M 6/42* (2006.01)
(52) U.S. Cl.
USPC .......................................... 429/120; 429/151
(58) Field of Classification Search
USPC .................................................. 429/120, 151
See application file for complete search history.

(56) References Cited

U.S. PATENT DOCUMENTS

| 6,340,877 | B1 * | 1/2002 | Mita et al. ..................... 320/112 |
| 6,344,728 | B1 * | 2/2002 | Kouzu et al. .................. 320/116 |
| 6,479,187 | B1 | 11/2002 | Takasaki et al. |
| 2002/0177035 | A1 | 11/2002 | Oweis et al. |
| 2005/0079408 | A1 * | 4/2005 | Hirano ............................ 429/82 |

FOREIGN PATENT DOCUMENTS

| DE | 102007021309 A1 | 11/2008 |
| EP | 1990862 A1 | 11/2008 |

OTHER PUBLICATIONS

English language abstract for DE 102007021309 extracted from espacenet.com database, dated Jun. 8, 2009.

* cited by examiner

*Primary Examiner* — Karie O'Neill Apicella
(74) *Attorney, Agent, or Firm* — Howard & Howard Attorneys PLLC (57) ABSTRACT A power train battery assembly of an electric, fuel-cell or hybrid vehicle for transporting passengers or goods has a plurality of prefabricated battery cells (12), each encased in an individual, externally-closed housing (14). The battery cells (12) are radially clamped by a plurality of walls (2 to 8), corresponding clamp sections (26) being provided on the walls (2 to 8).

27 Claims, 12 Drawing Sheets

POWER TRAIN BATTERY ASSEMBLY OF AN ELECTRIC, FUEL-CELL OR HYBRID VEHICLE

RELATED APPLICATIONS

This application claims priority to and all the advantages of German Patent Application No. DE 10 2008 009 041.7, filed on Feb. 14, 2008.

The invention relates to a power train battery assembly of an electric, fuel-cell or hybrid vehicle for transporting passengers and/or goods, said assembly having a plurality of prefabricated battery cells, each encased in an individual, externally-closed cell housing, and a housing that fixes the battery cells together, the battery cells being arranged in rows. The invention can be used in cars as well as in lorries or other vehicles.

Owing to the called for reduction in $CO_2$, the number of vehicles powered electrically, at least by way of assistance, will increase. High capacity batteries with NiMH- or Li-ion battery cells will be used as an energy source, as the present invention preferentially provides for. These prefabricated cells are combined into a cell packet and are electrically connected in series in such a manner that from many individual battery cells, conventionally with a voltage of 3.6, a high capacity battery, or, more precisely, a high-capacity storage battery results. The battery packet is contained in a stabile metal housing. Owing to the very large size of such battery assemblies, they heretofore had to be placed in locations in the vehicle that were not yet envisaged for energy storage, for example beneath the auto body behind the rear axle. The stability of the housing as well as the positioning of the individual battery cells must also be secured so that in the event of a crash no short circuits or combustion, even, occurs. For this reason, it is important to use stable housings.

In such power train battery assemblies, prefabricated, externally closed battery cells are joined with a high-voltage battery (customary voltages of 130 volts for the so-called "mild" hybrids and 360 volts for a "full" hybrid) in the joint housing. The battery cells should not exceed their maximal cell temperature of 55° C. to 80° C. which would limit the lifetime of the cells. A non-homogeneous temperature distribution between the cells can also reduce battery cell life and thus the life of the entire assembly. It is therefore important to ensure that the temperatures between the cells does not differ by more than ±2 to 5 K, preferably by only ±2 to 3 K. Since the cells are electrically connected in series, one defective cell can lead to the complete failure of the entire battery assembly. Considerations have already been made regarding how to maintain the battery assembly at a constant temperature by means of an active fluid cooling system.

From the previously unpublished DE 10 2007 021 309.5, which is fully incorporated herein, it is disclosed that the individual battery cells are surrounded with thin metal fins that, in turn, are thermally coupled to a tube conveying a cooling fluid. To ensure a no-play mounting of the battery cells in the housing, it was suggested to provide elastic plastic tabs between the battery cells as a part of the outer housing.

The object of the invention is to create a power train battery assembly with a simply constructed housing that nevertheless can still compensate for the indeed considerable diameter tolerances of the battery cells so as to ensure a rattle-free and fixed in place mounting.

Moreover, during active cooling of the power train battery assembly, a guaranteed heat transfer between the individual battery cells and the cooling fluid ought to be ensured despite the unavoidable tolerances of the individual components.

The first problem mentioned above addressed by the invention is solved by a power train battery assembly of the type mentioned above in such a manner that the housing has at least two gripping walls per row, which walls are arranged at opposite outer areas of the circumference of the battery cells and which walls are braced by holding means in the radial direction of the battery cells against one another in order to radially clamp the battery cells therebetween, each wall having a corresponding clamp section for each battery cell.

The power train battery assembly according to the invention accordingly has a housing that is composed of a plurality of walls that are relocatable with respect to each other during assembly. This design makes it possible to clamp the cells between the walls in order to attain tolerance compensation.

The walls are preferably flexible and thus can be bent differently from battery cell to battery cell so that the walls can conform to the tolerance of every individual battery.

According to the preferred embodiment, the walls are prefabricated, separate components that initially are joined to each other by holding means. It would furthermore also be possible, for example, to join the walls by way of plastic bridges in such as manner that they can be manufactured as a joint component that would then be bent around the plastic bridges so as only to be able to move the walls toward each other.

The holding of the battery cells is improved by the walls having clamp sections, in particular half-shell shaped clamp sections, conforming to the exterior circumference of the battery cells.

According to the preferred embodiment, the clamp sections have a radius that is greater than the largest radius of a battery cell, said radius lying within the tolerance range. This is intended to ensure that even the battery cells that use up the entirety of the tolerance range can be held in the clamp sections.

The clamp sections are preferably located at the axial end sections of the battery cells, that is to say above and below the battery cells so that space remains available therebetween for the active cooling system, for example.

The active cooling system comprises at least one cooling fluid conducting tube for dissipating heat energy from the battery cells, which tube extends through the housing. More particularly, the tube extends through the housing in a crenellation or wave-like arrangement in order to provide a surface that is as great as possible for heat transfer.

The tube has, in particular, straight and curved areas, support sections of the wall being intended to abut only the straight, closely tolerated areas. These support sections fix the position of the tube in the housing and ensure that the fins contact the tube. The support sections themselves protrude from the wall, are formed integral therewith, and are spaced from the clamp sections. This spacing is very important since the bent tube naturally has manufacture-related high tolerances that are not intended to complement the tolerances of the battery cells, which would indeed be the case if the clamp sections also formed the support sections for the tubes.

It is particularly advantageous if the entirety of the wall is flexible and the support sections are remote from the clamp sections so that the sections of the wall that form the support sections and the clamp sections can conform separately to the components to be held (battery cells or tube, whichever the case may be). It can of course be advantageous if the support and/or clamp sections are flexible extensions of the wall.

As already mentioned, the power train battery assembly can dissipate the heat energy of the cells in the direction of the tube by means of cooling fins. To achieve this, the tube is coupled to cooling fins that abut battery cells.

It is primarily important that the cooling fins extensively abut the tube and the batteries so as to provide a large heat exchange surface. Sections of fins pressed onto the wall are provided herefor, which sections protrude from the wall, said fins flatly press on the circumference of the batteries.

It is also particularly preferred if the pressed-on fin sections form elastic wall sections in order to guarantee prestressing.

The pressed-on fin sections can have a shape that conforms to a battery shape in order to ensure a flat pressing.

For the simple manufacture of the walls, it can be advantageous to design the pressed-on fin sections as integral with the support sections so that the pressed-on fin sections emanate from and extend away from the support sections. Both types of the sections should, however, be mechanically decouplable from the other in such a manner that each exercises a prestressing force on the abutting component (fins on the battery cells or on the tube) in order to ensure their position is fixed and to guarantee that the abutting components are contacted.

The pressed-on fin sections and the fins themselves should preferably both be positioned distanced from the clamp sections in order to ensure at this location an independent fixing of position and contacting as well.

It would be disadvantageous if the fins were to be positioned between a clamp section and the battery cell. In this instance, the tolerance of the fin would namely add up with the tolerance of the battery cell and with those of the clamp sections.

As previously suggested, the radial clamping of the battery cells, the contacting of the battery cells with the cooling fins, and the contacting of the cooling fins with the tubes are each intended to occur by applying pretensioning by means of different sections of the wall.

In the preferred embodiment of the invention, the walls are composed of plastic in order for the wall sections to attain sufficient flexibility.

The walls, more particularly, are joined to one another by means of a cover that, in addition to the holding means, makes an additional fastening of the walls possible.

The battery cells can be axially tensioned and axially no-play fixed in place above the cover.

The cover is screwed together with the walls, in particular. By means of screwing down the cover, the holding means can also optionally be fixed in place in that the screws extend to the holding means.

The holding means are, in particular, projections provided on a wall, which projections enter corresponding recesses of the opposing wall. In this manner, the holding means and the recesses are so aligned with each other that the holding means can enter the recesses at different depths that even cover the entirety of the tolerance range of the battery cells having different thicknesses.

According to a preferred embodiment of the invention, it is provided for that the holding means have toothing on their exterior surface, which toothing meshes in a form-fitting manner with the surface of the associated recess.

If the recess has a counter-toothing, a catching connection is formed. Without additional, separate screwing etc., it is thereby possible to move the walls toward one another in a simple fashion and to create a locking connection therebetween in certain locations.

At least one holding means is provided between adjacent battery cells, in particular, so that both the prestressing and the conforming of the wall to each individual battery cell are possible.

The holding means moreover are intended to be axially positioned in the area of the clamp sections in order to ensure a direct transmission of force to the clamp sections.

The axial length of the holding means preferably corresponds to at least 0.8 times the axial length of the according clamp section so that force is transmitted to the battery cell by means of the great extent of the length of the clamp section.

By dividing the housing into walls that are stacked in layers with the rows of battery cells, further advantages can also be achieved. First, housing manufactured in that way is very cost effective, strong, and lightweight, and second, it is possible to manufacture modular housing. Since the number of obstructed battery cells varies, a plurality of the very same wall components can simply be stacked one on top of the other to arrive at a power train battery assembly having a different capacity.

Additional features and advantages of the invention are apparent from the following description and from the following drawings to which reference is made. The drawings show in.

Figure 1:
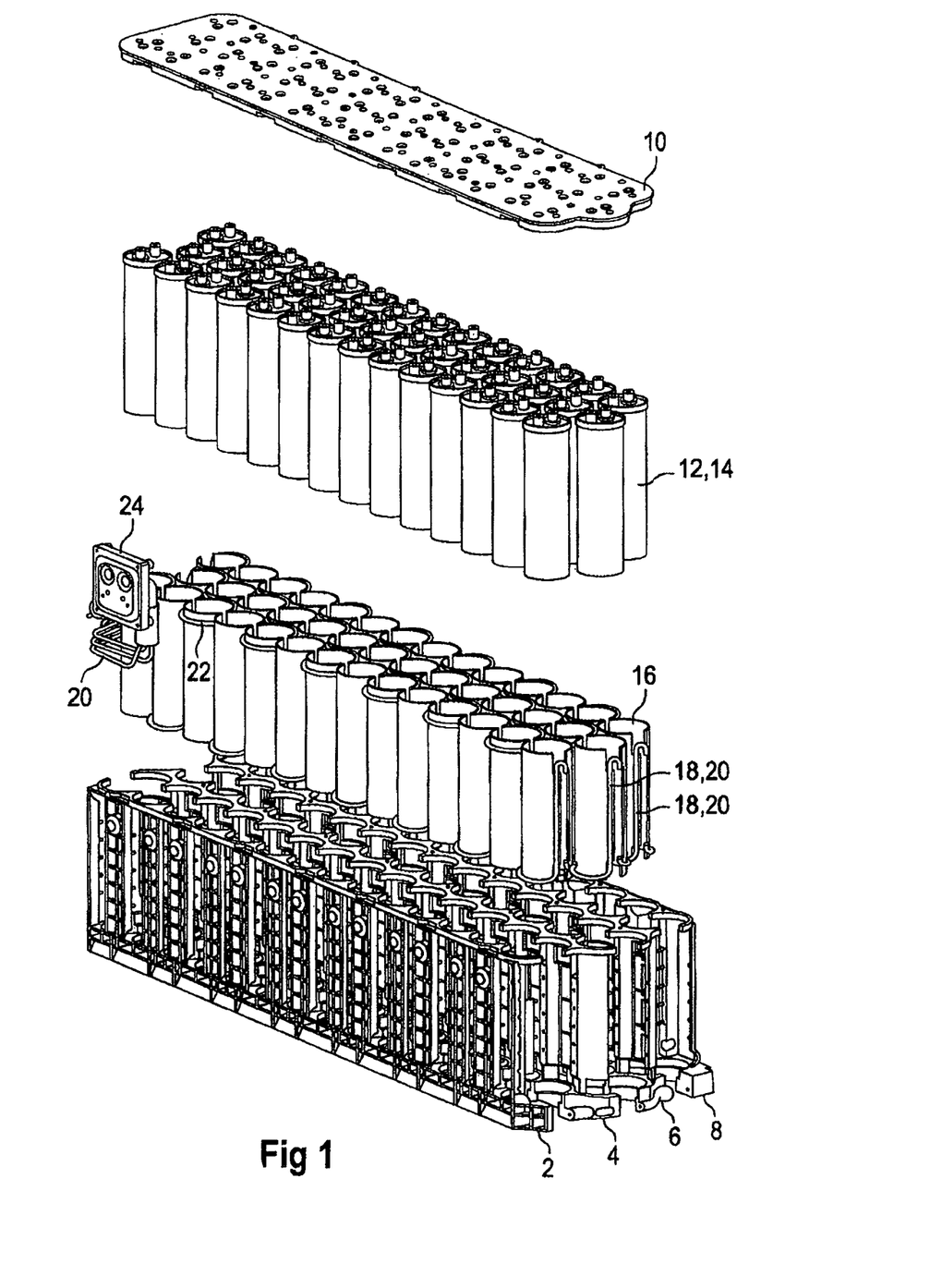
FIG. 1 a perspective explosion view of the power train battery assembly according to the invention, FIG. 2 an enlarged view of the walls positioned one adjacent the other and the unit composed of tubes and cooling fins, FIG. 3 both the unit composed of walls, tubes, and fins as well as the battery cells to be situated therein, FIG. 4 a plan view of the not yet completely assembled power train battery assembly, FIG. 5 the power train battery assembly shortly before the attaching of the cover, FIG. 6 the completely assembled power train battery assembly according to the invention, FIG. 7 a schematic longitudinal sectional view through the battery assembly in the area of a battery cell, FIG. 8 a sectional view through the power train battery assembly alongside the line VIII-VIII in FIG. 7, FIG. 9 an enlarged cross-sectional view through a power train battery assembly according to the invention in the area of the cooling fins according to the line IX-IX in FIG. 7, FIG. 10 a schematic view in perspective of a wall used in the power train battery assembly according to the invention, FIG. 11 two opposing walls that can be used in the power train battery assembly according to the invention, FIG. 12 an enlarged sectional view through the power train battery assembly in the area of the holding means, FIG. 13 an enlarged view of a holding means according to another embodiment, FIG. 14 an enlarged sectional view through the power train battery assembly according to another embodiment in the area of a holding means shortly prior to the creation of a locking connection, FIG. 15 a schematic sectional view through a battery cell of an assembly according to another embodiment of the invention, FIG. 16 an explosion view of the cooling device of the assembly according to FIG. 15, FIG. 17 a plan view of one component of the assembly according to FIG. 15, FIG. 18 the assembly according to FIG. 15 with the battery cells not yet inserted, and FIG. 19 a schematic sectional view through an alternative embodiment of holding means between adjacent walls.

FIG. 1 shows a power train battery assembly of an electric, fuel-cell or hybrid vehicle that is equipped with an active cooling. The external housing comprises a plurality of walls consisting of plastic 2, 4, 6, and 8, the walls 2 and 8 representing external walls and the walls 4 and 6 representing internal walls. The external housing moreover comprises a cover 10 that can be screwed on. Walls 2 to 8 and cover 10 are composed of PP, PA, PPS, or PPA manufactured by injection moulding.

Numerous battery cells 12 are contained in the housing and are connected in series, thereby creating a high-voltage battery, more precisely a high voltage storage battery. The individual battery cells 12 are NiMH- or Li-ion batteries and self-contained units that are exteriorly closed by an individual cell housing 14. The battery cells 12 are combined into a packet either prior to assembly in the external housing or only upon placement in the external housing.

As can be seen from FIG. 1, the battery cells 12 are arranged in parallel rows. In the embodiment according to FIG. 1, there are three parallel cell rows.

Each battery cell 12 is externally encompassed by cooling fins 16 on its cell housing, which is composed of metal.

Figure 2:
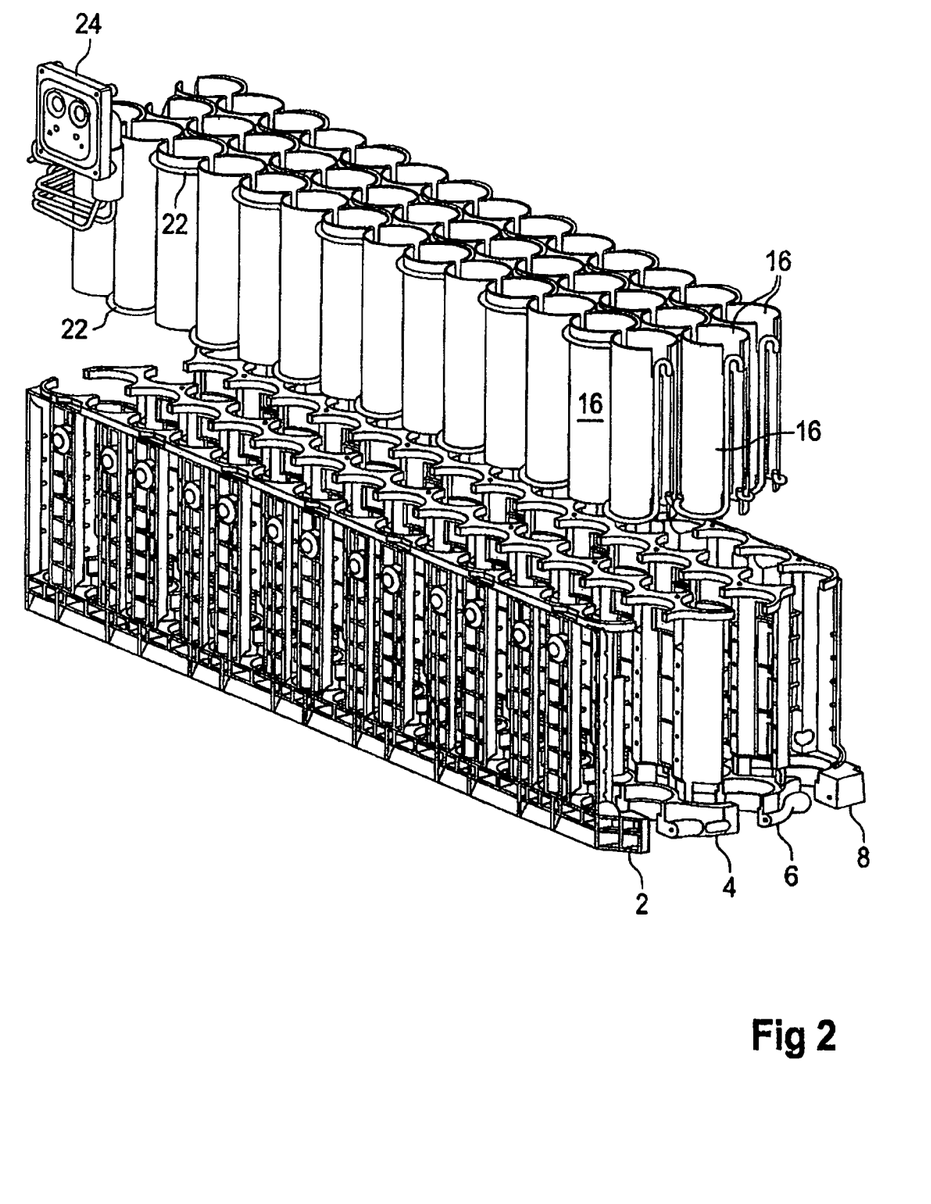

As can be seen from FIG. 1 and from FIG. 2 in particular, the cooling fins 16 are thin sheet metal, are formed to have a wave-like shape in order to conform to the shape of the battery cells 12, and optimally to hug said cells. Each cooling fin 16 encompasses barely half of the outer circumference of a battery cell row, resulting in two cooling fins 16 acting upon opposing sections of each battery cell 12 per battery cell row. The battery cells 12 are largely "packed" in the cooling fins 16.

To ensure sufficiently favourable heat dissipation, a plurality of tubes 18 are provided that conduct cooling fluid, are in direct contact with the associated cooling fins 16, and have a crenellation arrangement that extends upwards and downwards along the length of the cooling fins 16. Each tube 18 has both a section 20 that runs in a straight manner, each said straight section running along the outermost ends of a half-shell section of a cooling fin 16, as well as the tube 18 having an almost semicircular, bent section 22 that joins the adjacent straight sections 20. The bent section 22 as well as the straight sections 20 are in contact with the associated cooling fin. As can easily be seen in FIG. 2, the tube 18 runs downward alongside one side of a half-shell section of a cooling fin 16, then over the bent section 22 to the opposing straight section 20 from which it then travels upward to conclude by running over the next bent section 22 to the adjacent half-shell section and so on and so forth.

A tube 18 thereby preferably dissipates the heat from a cooling fin 16. The tubes 18 lead into a cooling fluid connection 24 that leads to a cooling circuit.

Figure 3:
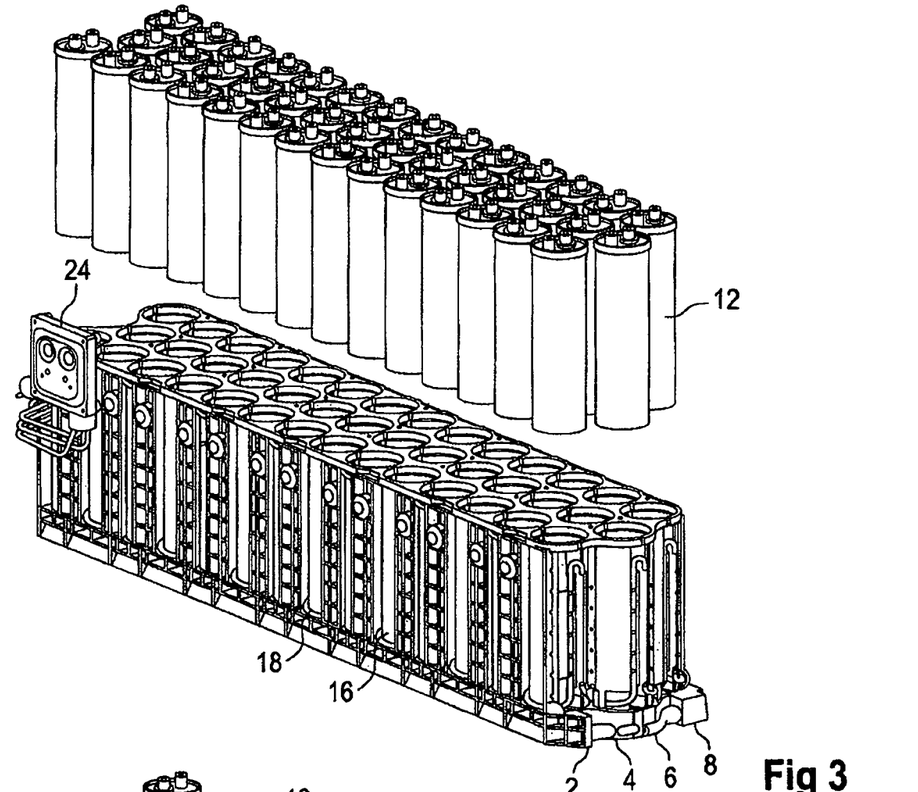

The cooling fins 16 and the tubes 18 are not welded or soldered together, but rather rest more or less loosely side by side in the initial position. The packet composed of cooling fins 16 and tube 18, as it is shown in FIGS. 1 and 2, is positioned between the corresponding walls 2 to 8, the walls 2 to 8 initially being still clearly distanced one from the other. Finally, the packet composed of battery cells 12 or the individual battery cells 12 themselves are inserted from above into the chambers formed by the corresponding walls 2 to 8 and cooling fins 16 (see FIG. 3), in this state there being no press fit, thereby making for a very easy insertion of the battery cells 12.

Figure 4:
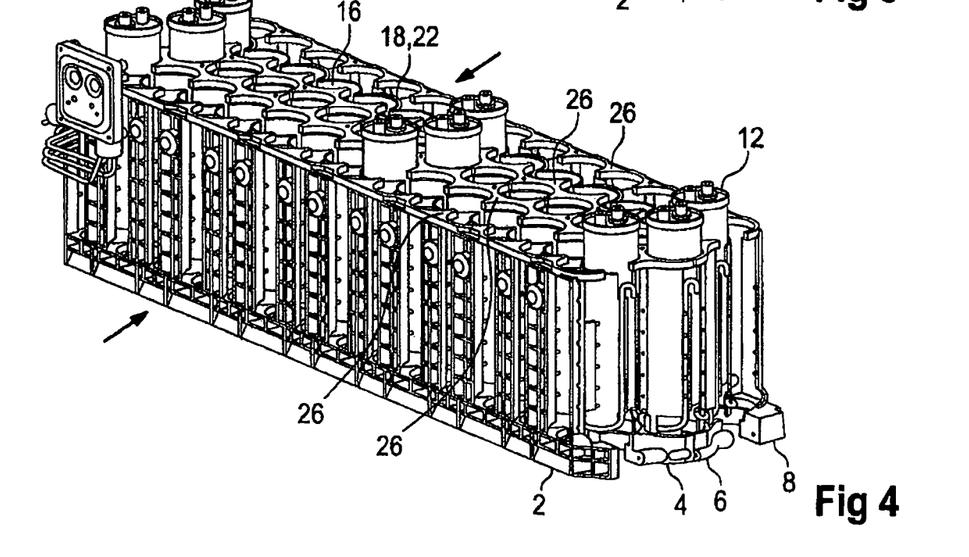

Some almost entirely inserted battery cells 12 are shown in FIG. 4.

After all cylindrical chambers formed by walls 2 to 8 and cooling fins 6 are loaded with battery cells 12, the walls 2 to 8 are slid together transverse to their longitudinal extension (see arrow in FIG. 4).

Figure 7:
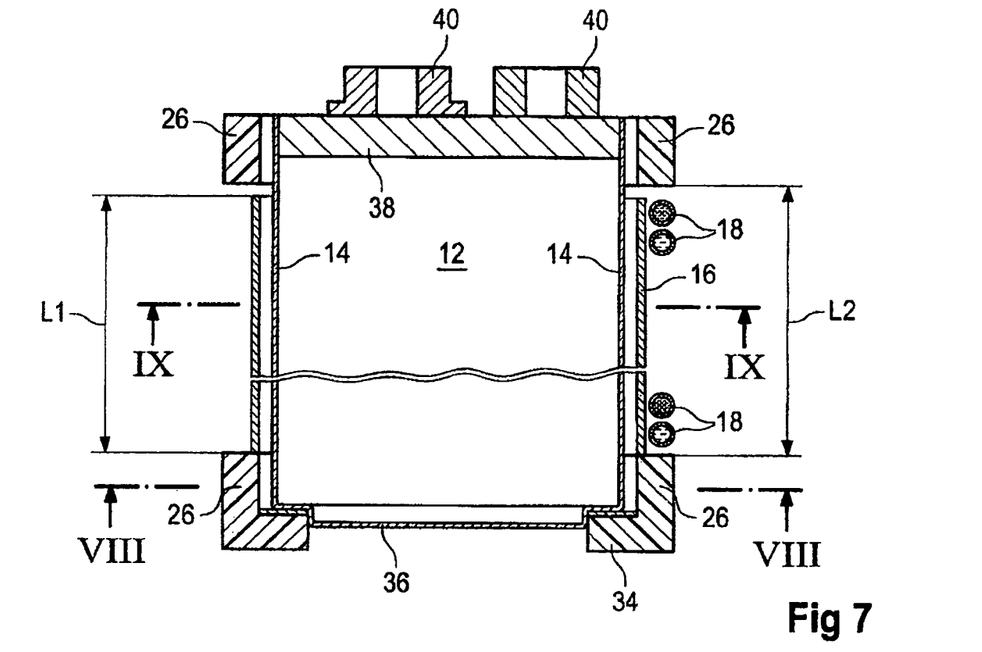
Figure 8:
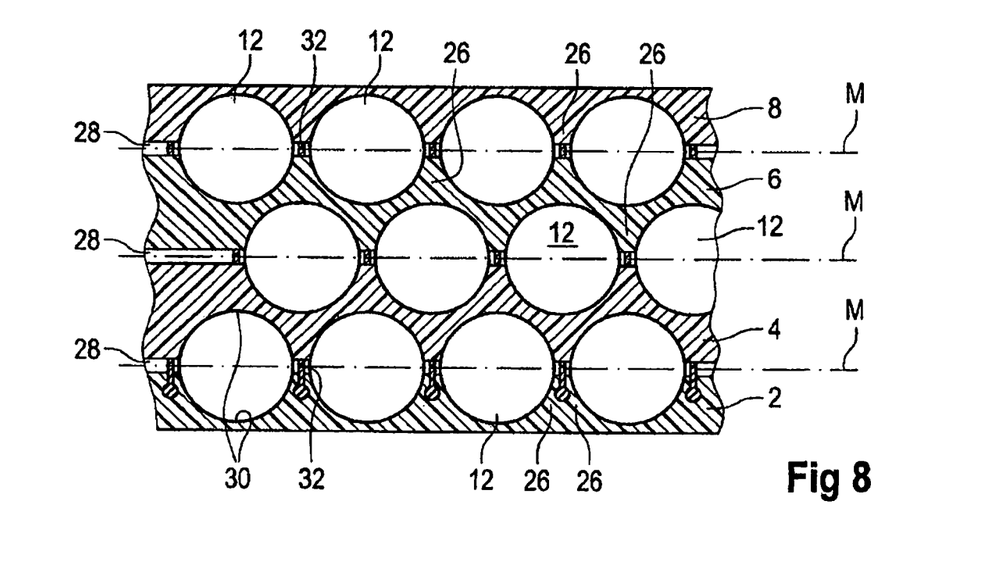

As is very clear from FIGS. 4, 7, and 8, the upper and lower edges of the walls have clamp sections 26 in the shape of a half shell, which clamp sections encompass the axial ends of the battery cells 12 and directly abut them. In using circularly cylindrical battery cells 12, the diameter of the clamp section 26 is minimally greater than the maximum diameter of the largest battery cell 12, which battery cell diameter is at the uppermost limit of the tolerance.

What's more, the clamp sections, which are an integral component of the each wall 2 to 8, project radially outward only so far as to terminate before the "axis" M of a battery cell row (see FIG. 8) so that a gap 28 always remains between adjacent, facing projections of the clamp sections 26. The presence of this gap 28 ensures that even with the smallest battery cells 12, a clamping force always exists between the adjacent walls 2 to 8 by means of which force the walls act upon opposite external areas 30 of the periphery of the battery cells 12 (see FIG. 8)

As can likewise be seen in FIG. 8, holding means 32 are provided that are integrally formed with the walls 2 to 8, protrude therefrom, engage in recesses of the opposing walls 2 to 8, and serve to fasten the walls 2 to 8 to each other. By means of these holding means 32, the walls 2 to 8 are grouped into a joint housing. Additional details related to the holding means 32 follow hereinafter with reference to FIGS. 11 to 14.

It can furthermore be seen in FIG. 7 that the lower end of the walls 2 to 8 have a socket section 34 in half-ring shaped extensions on which the battery cells 12 rest in an axial direction. Each battery cell 12 is intended to axially protrude somewhat over the associated wall in an upward direction.

It is also possible to see the front walls 38 of the battery cells 12 as well as electrical contacts 40 in FIG. 7.

Finally, one also sees in FIG. 7 a cooling fin 16 with a corresponding tube 18 that is cut concentrically through the bent section 22 (hereinafter also referred to as the tube bend). Should the tube bend be shifted within the extension of the cooling fins 16, the rows adjacent the bent sections 22 are arranged offset in the longitudinal direction of the cell axis.

This arrangement is shown in FIG. 7 through the arrangement of the upper and lower pairs of tubes 18 one atop the other, the upper and lower pair each being associated with the upper and lower tubes. The height offset of the tube bends ensures that the tubes 18 do not cross in the region of the bent sections 22, and the minimal distance between the cells is equivalent to twice the thickness of the cooling fin 16 plus a tube diameter.

The cells can be positioned more closely together if the tube bends are shifted outside the axial extension of the cooling fins 16 and the cells, according to FIGS. 15 to 18. In this instance, the minimal cell distance is only twice the thickness of the cooling fin 16.

FIG. 7 shows the individual components somewhat distanced from each other, for example the fins 16 are distanced from the cell housing 14, just as the clamp sections 26 are distanced from the battery cells 12. However, this is only for the purpose of reproducing differentiations, for truly the components are intended to be in contact with each other in the final assembled state.

It is, however, easily recognised that the cooling fins 16 are situated between the clamp section 26 and do not become positioned in the areas between clamp sections 16 and the corresponding sections of the battery cells 12 which the clamp sections 26 directly abut. The distance L2 of the clamp sections 26 is accordingly also greater than the axial height L1 of the cooling fin 16 lying therebetween.

Figure 9:
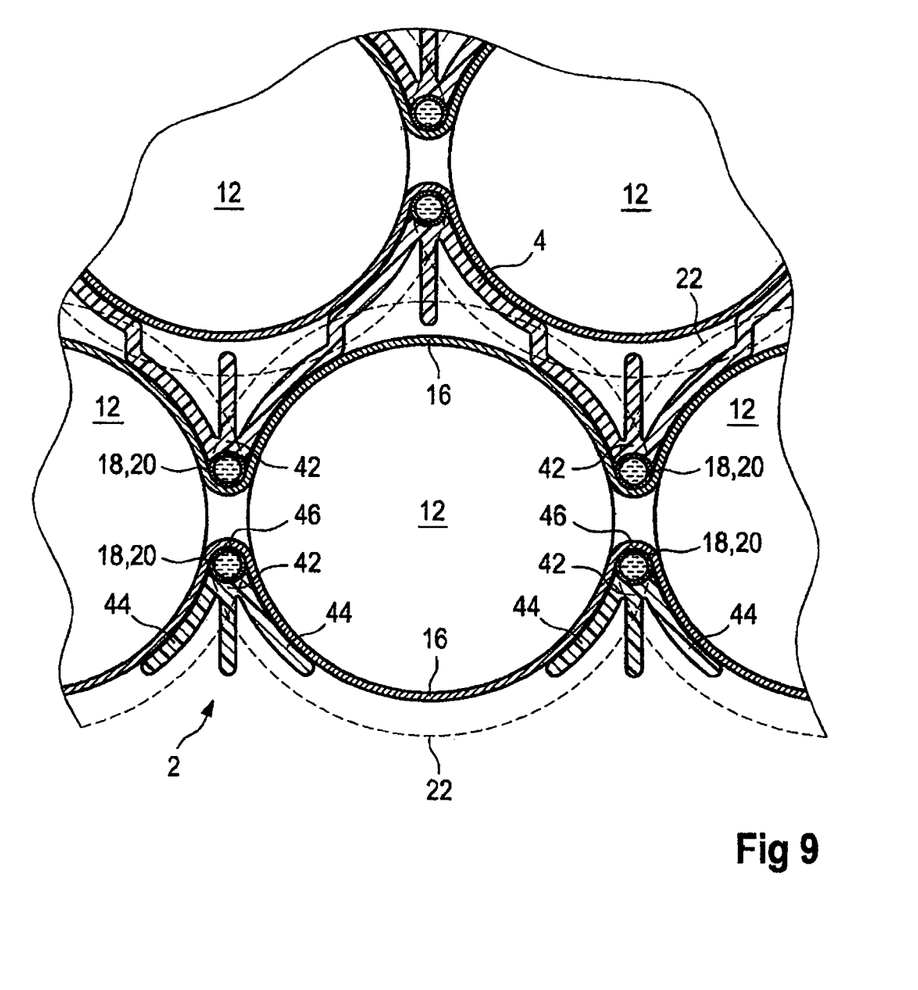

In FIG. 9, the position of the tube 18 and the cooling fin 16 can be better seen. Flexible, rib-like supports are integrally formed on the walls 2 to 8 and serve to position the cooling fin 16 and the tube 18. Support sections 42 run axially along the walls 2 to 8 between the clamp sections 26 and exhibit a shell shape that conforms to the tubes 18 so that the tubes 18 are well positioned thereon. The pressed-on fin sections 44 emanate from the support sections 42 at nearly a 90° angle one to the other in order to serve as a press-on section 44 for adjacent battery cells 12.

As can be seen in FIG. 9, the pliant and very elastic pressed-on fin sections 44 press the cooling fins 16 against the battery cells 12. The cooling fins 16 completely cover the surface of the battery cells 12 in this manner. At the same time, the support sections 42 press the tubes 18 against those cooling fin sections 46 that are positioned between the adjacent battery cells 12 and that are bent to correspond with the tubes 18 in this area in order to envelop them.

The support sections 42 and the press-on fin sections 44 are distanced from the clamp sections 26 and, rather than serving to fix the battery cells 12 in place, they instead have individual components that they position, namely the tubes 18 or the cooling fins 16.

The radial clamping of the battery cells 12, the contacting of the battery cells 12 with the cooling fins 16, and the contacting of the cooling fins 16 with the tubes 18 each occurs by means of applying prestressing through the different sections of the walls 2 to 8, that is to say through sections functionally different from one another in the form of the clamp sections 26, the press-on fin sections 44, and the support section 42.

Despite vast tolerances, the prestressing is ensured between all components owing to the flexibility of the walls 2 to 8 and the sections which are designed to be straight 26, 42, and 44.

Figure 10:
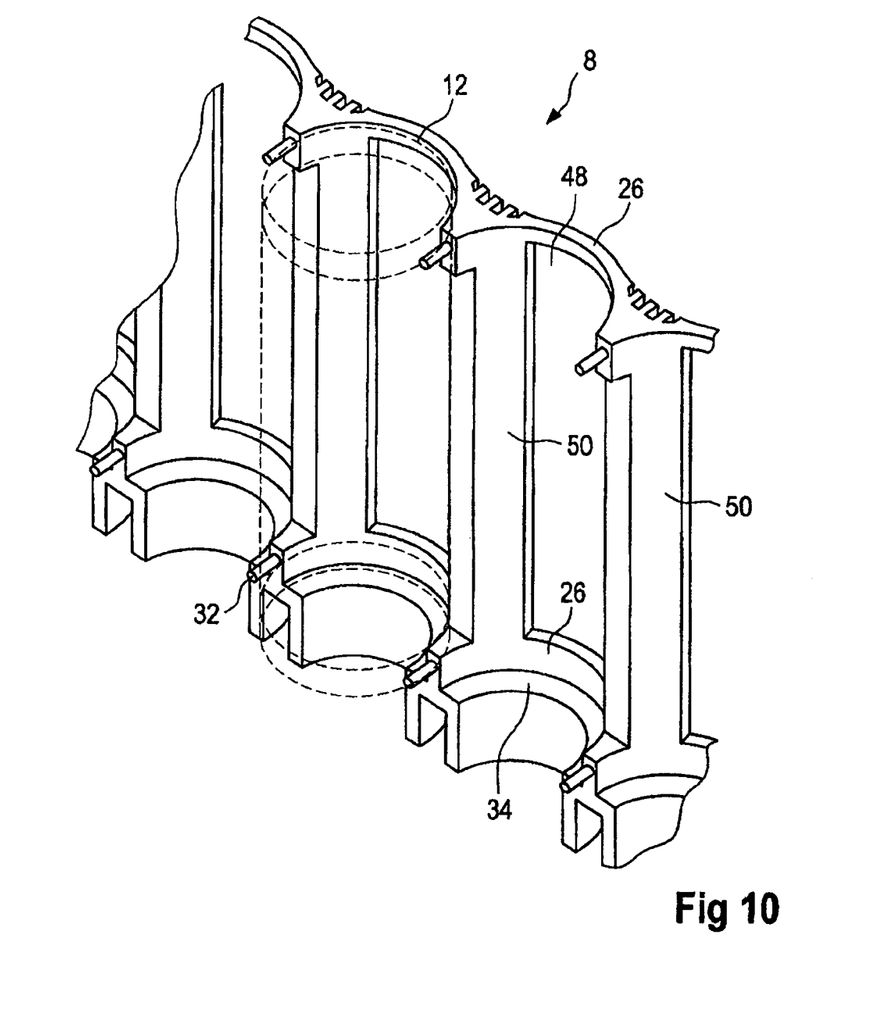

In FIG. 10, one can see the socket sections 34, which in this case are integrally formed in the wall 8, the clamp sections 26, as well as the holding means 32 in this case designed as pins. A battery cell 12 is also suggested by broken lines. In order to reduce weight, the walls 2 to 8 have window-shaped recesses 48 axially positioned between the clamp sections 26 so that linking bars 50 are formed. These linking bars 50 are simplified in FIG. 10. In reality, they have rib-like extensions in the form of support and press-on fin sections 42, 44, as FIG. 9 represents them in cross-section.

Figure 5:
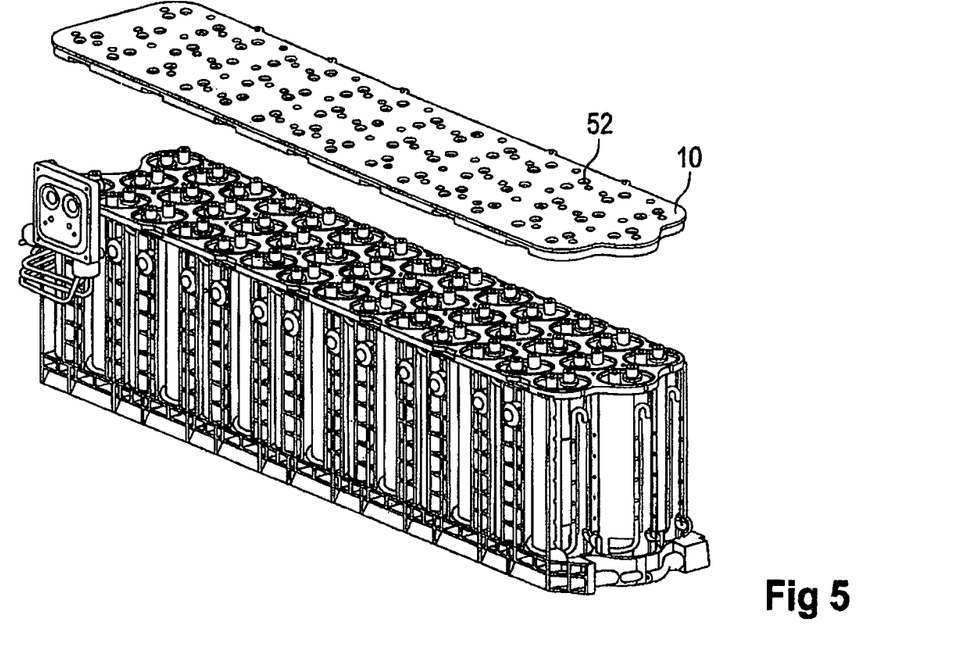

After the insertion and radial clamping of the battery cells 12, cooling fins 16, and tubes 18, the cover 10 (see FIGS. 1 and 5) is placed from above on the walls 2 to 8 and screwed thereto. The cover 10 has numerous openings 52 through which the contacts 40 can pass. The cover 10 braces the battery cells 12 axially between itself and the socket sections 34 so that an axial positioning without play is also ensured.

The cover 10 is also intended to be composed of plastic and exhibit a certain degree of give in order to accommodate the length tolerances of the battery cells 12.

Figure 6:
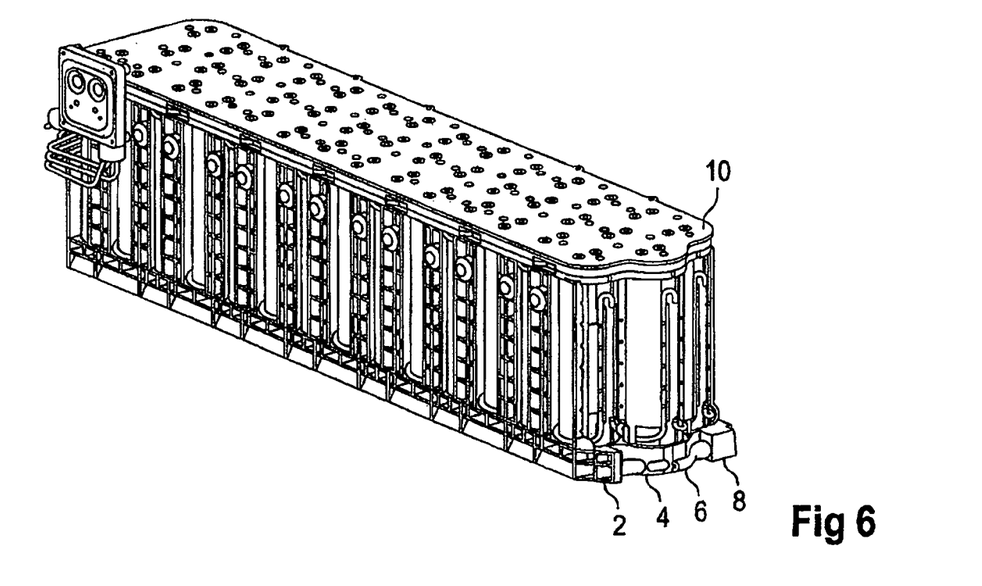

After connecting the cover 10, the power train battery assembly maintains the very compact form according to FIG. 6.

Figure 11:
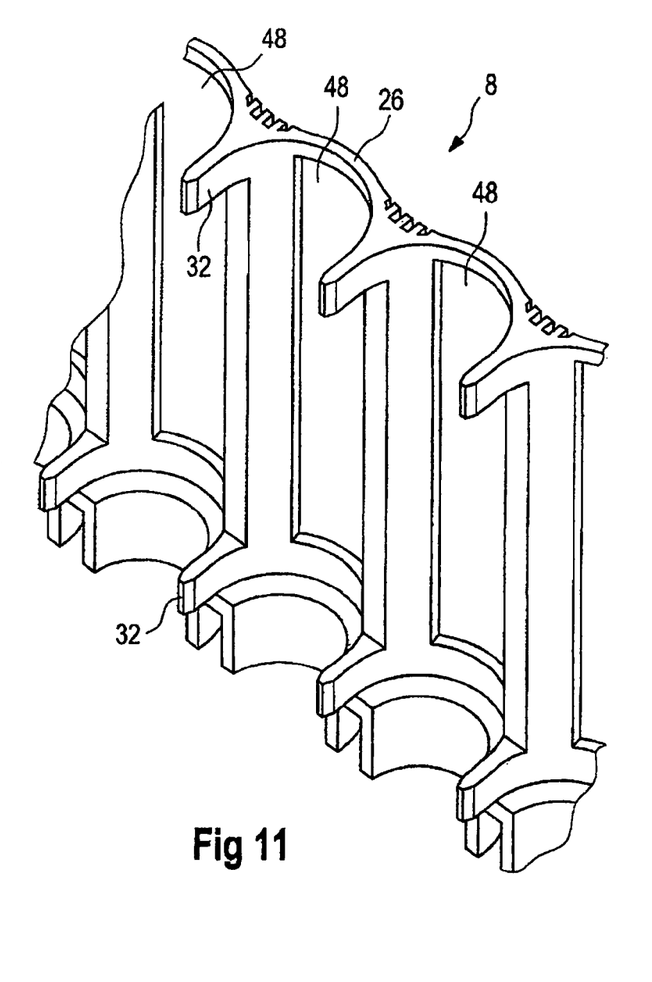

Instead of the peg-shaped holding means 32, said holding means can also be stretched in the axial direction and be wedge-shaped, as in FIG. 11.

The holding means 32 have an axial length, or better, height, that corresponds to at least 0.8 times the axial length of the according clamp section 26. In the example shown in FIG. 11, the holding means 32 are even considerably higher than the clamp section 26.

The complementary recesses 54 provided on the opposing wall 6 are correspondingly slit-shaped.

Figure 12:
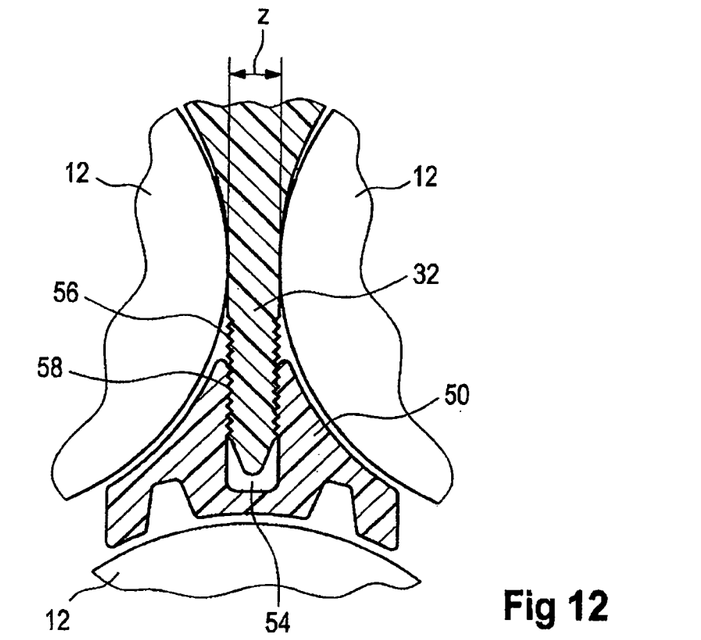

It can be seen in FIG. 12 that the holding means 32 form a locking connection since they have on their external side a sort of toothing 56 that engages with the corresponding counter-toothing 58 upon entering into the recess 54. The distance between two adjacent teeth should therefore lie between 0.1 and 1 mm. The locking connection also achieves a form-fitting connection between the walls 2 to 8 by means of which form-fitting connection the prestressing is also impinged upon the components to be pressed together.

The thickness Z (see FIG. 12) of the holding means 32 viewed from the axial direction is intended to be between 0.5 times the distance of adjacent battery cells 12 and the distance of adjacent battery cells 12.

Figure 13:
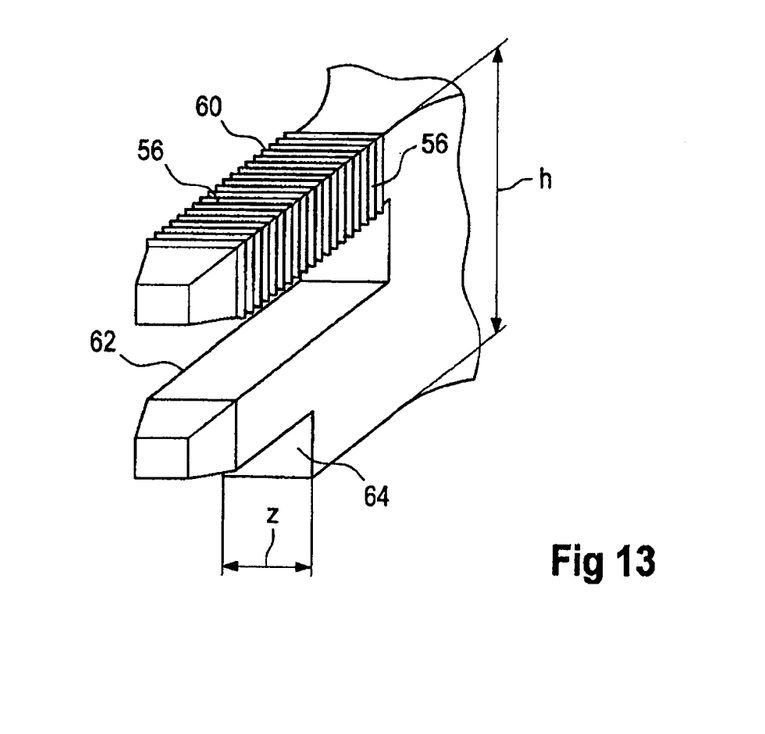

The holding means 32 can also be distributed among individual projecting holding means 60, 62 according to FIG. 13. The height of the entire projection h corresponds to the height of the clamp section 26. Furthermore, a stop collar 64 can be provided on one individual holding means, as the present holding means 32, which stop collar sets the maximally greatest entrance depth to be avoided by the holding means 32 in the corresponding recess 54.

Instead of or in addition to the catching of the holding means 32, another way to ensure the walls 2 to 8 are secured with respect to one another is that the screws, with which the cover 10 is attached to the walls 2 to 8, can penetrate up to the holding means 32 and fasten them relative to the adjacent wall.

Figure 14:
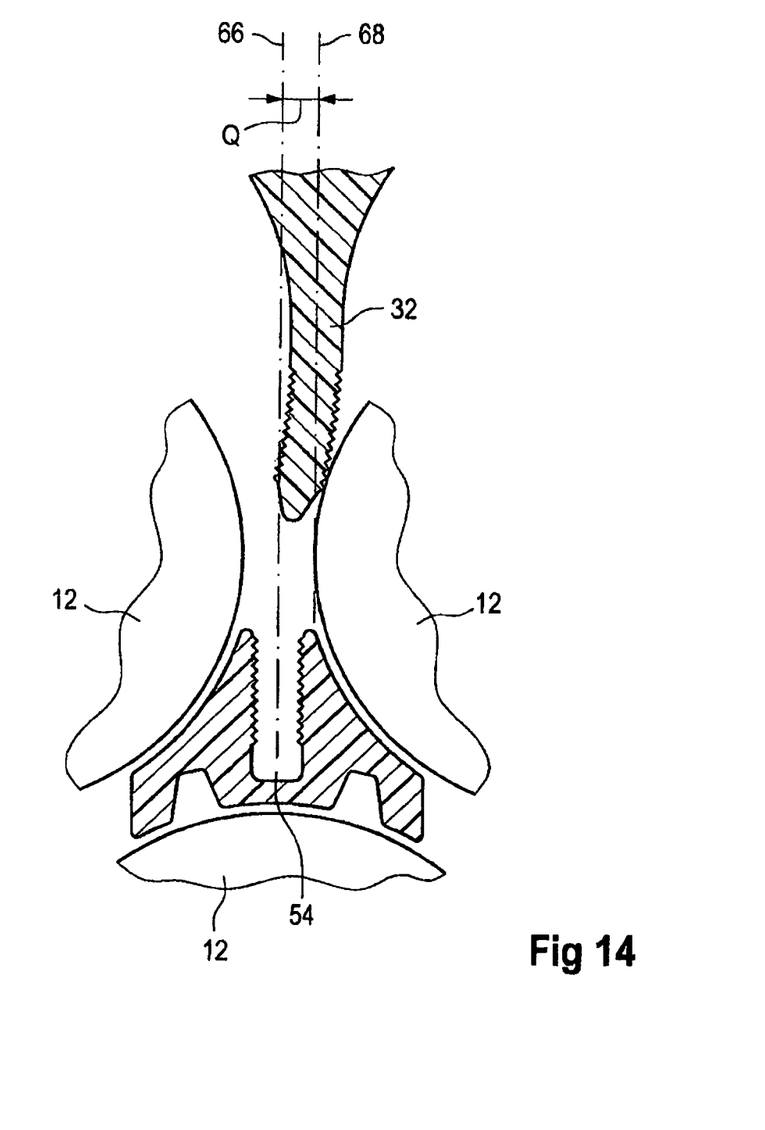
Figure 15:
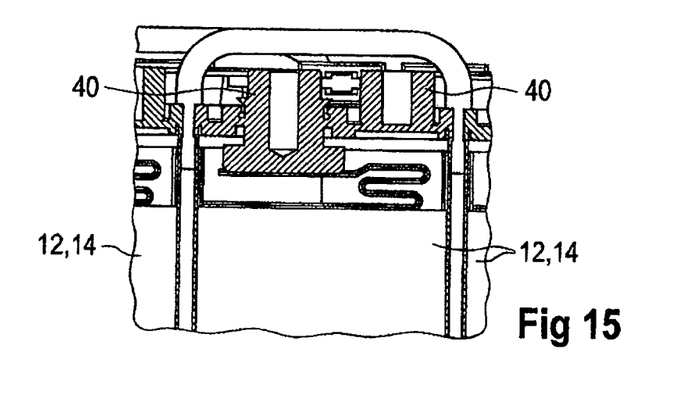

One can see from FIG. 14 the maximal off-set between a holding means 32 and the associated recess 54, that is to say the off-set between adjacent walls 2 to 8. Since the holding means 32 are elastic, the cross sections of the battery cells 12 are circular, and the holding means 32 have a cone at their tip, the axes 66, 68 of recess 54 and holding means 32 can correspond to approximately half the distance of adjacent battery cells 12, the cavity having a width likewise corresponding to approximately the distance of adjacent battery cells 12.

In order to make possible a sufficient clamping effect on each battery cell 12, always at least one holding means 32 ought to be positioned between adjacent battery cells 12. In particular, it is clearly two holding means 32, namely one holding means 32 at the axial height of each clamp section 26. Particularly with regard to the arrangement of the socket section 34 on the pole face (FIGS. 15-18), the holding means 32 can also be affixed above and below the cell span in the longitudinal axis instead of between the cells (FIG. 12). As FIG. 19 shows, this is possible on the pole side, for example between the poles 40.

Figure 19:
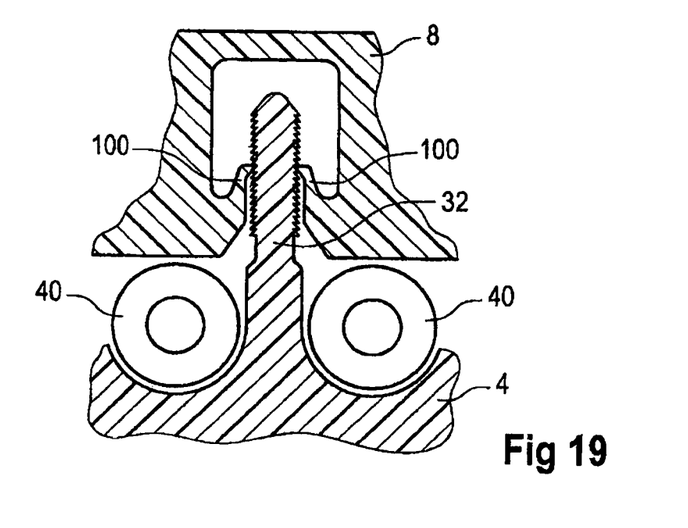

In contrast to FIG. 12 in which the catching results through an opening of both flanks on which the counter-toothing 58 is arranged, the counter-catching is arranged on an elastic clip 100 in the case of FIG. 19. This arrangement has the advantage that the pressing force can be reduced.

The housing has a modular design and consists of only side walls and simultaneously constructed centre walls, thereby making it possible for said housing to be expanded to accommodate even more rows of battery cells.

Figure 16:
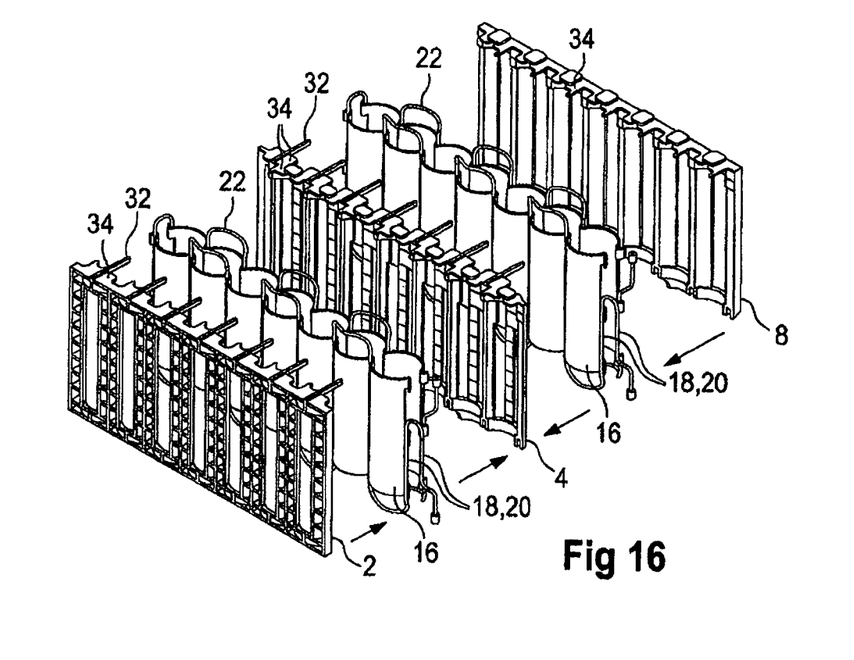
Figure 17:
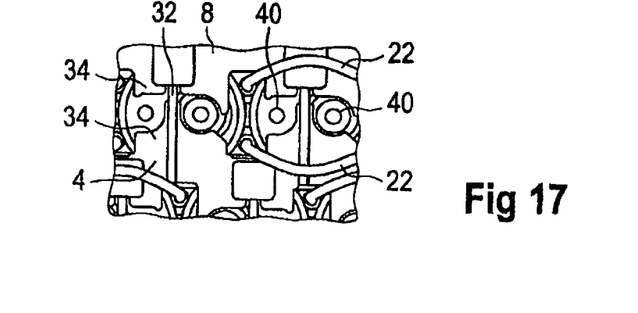
Figure 18:
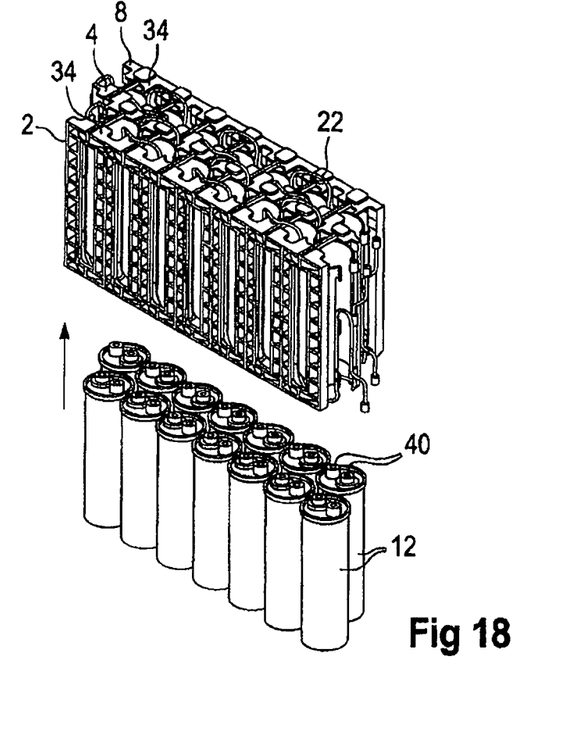

In the embodiments according to FIGS. 1 and 10, the socket sections 34 hold the cell floors in the axial direction (stop collar in the axial direction), while the cover 10 is arranged on the side of both poles 40. It is also just as possible to axially fasten the cells 12 by means of socket sections 34 that are affixed on the plastic components 2, 4, 6, 8 on the side of both poles 40, as is shown in FIGS. 16, 17, and 18. In this embodiment, the cover 10 is screwed on to the side of the cells 12 that is opposite the poles 40 (the so-called rupture floor side).

The advantage of this arrangement is that upon introducing the cells 12 through a corresponding receptacle of the asymmetrically arranged poles 40 in the socket section 34, a locking device results that prevents an inversion of the plus and minus poles.

In this embodiment as well, the bent sections 22 of the tubes 18 are positioned above and below the cells 12.

The invention claimed is:

1. Power train battery assembly of an electric, fuel-cell or hybrid vehicle for transporting passengers and/or goods, said assembly having
    a plurality of prefabricated battery cells (12), each encased in an individual, externally-closed cell housing (14) and
    a housing that fixes the battery cells (12) together, the battery cells (12) being arranged in rows,
    wherein the housing has at least two gripping walls (2 to 8) per row, which walls are arranged at opposite outer areas of the circumference of the battery cells (12) and which walls are braced by holding means (32; 60; 62) in the radial direction of the battery cells (12) against one another in order to radially clamp the battery cells (12) therebetween, each wall having a corresponding clamp section (26) for each battery cell (12),
    wherein at least one tube (18) that conducts cooling fluid extends through the housing to dissipate heat energy from the battery cells (12),
    wherein the at least one tube (18) is joined with cooling fins (16) that abut the battery cells (12), and
    wherein press-on fin sections (44) protrude from the wall and press the cooling fins (16) snugly against the periphery of the battery cells (12).

2. Power train battery assembly in claim 1, characterised in that the walls (2 to 8) are separate components that are joined together by the holding means (32; 60; 62).

3. Power train battery assembly as claimed in claim 1 characterised in that the walls (2 to 8) have clamp sections (26) that conform to the exterior circumference of the battery cells (12).

4. Power train battery assembly as claimed in claim 1, characterised in that the clamp sections (26) maximally extend to the central axis (M) of a battery cell row (12).

5. Power train battery assembly as claimed in claim 1, characterised in that the clamp sections (26) abut an axial end sections of the battery cells (12).

6. Power train battery assembly as in claim 1, characterised in that the tube (18) has straight and curved areas (20, 22) and is fixed in place by support sections (42) only at the straight areas (22), the support sections (42) protruding from the wall (2 to 8), being integrally formed therewith, and being spaced from the clamp sections (26).

7. Power train battery assembly as claimed in claim 1, characterised in that the press-on fin sections (44) have a shape that conforms to the shape of a battery cell (12).

8. Power train battery assembly as claimed in claim 1, characterised in that the press-on fin sections (44) are elastic in the radial direction.

9. Power train battery assembly as claimed in claim 1, characterised in that the press-on fin sections (44) emanate from the support sections (42) and extend away therefrom.

10. Power train battery assembly as claimed in claim 1, characterised in that the press-on fin sections (44) and the cooling fins (16) themselves are situated distanced from the clamp sections (26).

11. Power train battery assembly as claimed in claim 1, characterised in that the walls (2 to 8) are composed of plastic.

12. Power train battery assembly as claimed in claim 1, characterised in that the walls (2 to 8) are joined to each other by at least one cover (10).

13. Power train battery assembly as claimed in claim 12, characterised in that the cover (10) axially braces the battery cells (12) and axially fixes the battery cells (12) in place.

14. Power train battery assembly as claimed in claim 12, characterised in that the cover (10) is screwed to the walls (2 to 8).

15. Power train battery assembly as claimed in claim 1, characterised in that at least one holding means (32; 60; 62) is provided between adjacent battery cells (12).

16. Power train battery assembly as claimed in claim 1, characterised in that the holding means (32), with respect to the longitudinal direction of the battery cells (12), are arranged above and/or below the battery cells (12).

17. Power train battery assembly as claimed in claim 1, characterised in that the holding means (32; 60; 62) are positioned axially in the area of the clamp sections (26).

18. Power train battery assembly as claimed in claim 17, characterised in that the holding means (32; 60; 62) have an axial length that corresponds to at least 0.8 times the axial length of the associated clamp section (26).

19. Power train battery assembly of an electric, fuel-cell or hybrid vehicle for transporting passengers and/or goods, said assembly having
    a plurality of prefabricated battery cells (12), each encased in an individual, externally-closed cell housing (14) and
    a housing that fixes the battery cells (12) together, the battery cells (12) being arranged in rows,
    wherein the housing has at least two gripping walls (2 to 8) per row, which walls are arranged at opposite outer areas of the circumference of the battery cells (12) and which walls are braced by holding means (32; 60; 62) in the radial direction of the battery cells (12) against one another in order to radially clamp the battery cells (12) therebetween, each wall having a corresponding clamp section (26) for each battery cell (12),
    wherein at least one tube (18) that conducts cooling fluid extends through the housing to dissipate heat energy from the battery cells (12),
    wherein the at least one the tube (18) is joined with cooling fins (16) that abut the battery cells (12), and
    wherein the radial clamping of the battery cells (12), the contacting of the battery cells (12) with the cooling fins (16), and the contacting of the cooling fins (16) with the tubes (18) are each effected by applying pretensioning by way of different sections of the wall (2 to 8).

20. Power train battery assembly in claim 19, characterised in that the walls (2 to 8) are separate components that are joined together by the holding means (32; 60; 62).

21. Power train battery assembly as claimed in claim 19 characterised in that the walls (2 to 8) have clamp sections (26) that conform to the exterior circumference of the battery cells (12).

22. Power train battery assembly as claimed in claim 19, characterised in that the clamp sections (26) maximally extend to the central axis (M) of a battery cell row (12).

23. Power train battery assembly as claimed in claim 19, characterised in that the clamp sections (26) abut an axial end sections of the battery cells (12).

24. Power train battery assembly of an electric, fuel-cell or hybrid vehicle for transporting passengers and/or goods, said assembly having
    a plurality of prefabricated battery cells (12), each encased in an individual, externally-closed cell housing (14) and
    a housing that fixes the battery cells (12) together, the battery cells (12) being arranged in rows,
    wherein the housing has at least two gripping walls (2 to 8) per row, which walls are arranged at opposite outer areas of the circumference of the battery cells (12) and which walls are braced by holding means (32; 60; 62) in the radial direction of the battery cells (12) against one another in order to radially clamp the battery cells (12) therebetween, each wall having a corresponding clamp section (26) for each battery cell (12), and wherein the holding means (32; 60; 62) are projections provided on at least one the walls (2 to 8), which projections enter into corresponding recesses (54) of an opposite wall (2 to 8).

25. Power train battery assembly as claimed in claim 24, characterised in that the holding means (32; 60; 62) have a toothing (56) on their exterior surface, which toothing (56) meshes in a form-fitting manner with the surface of the associated recess (54).

26. Power train battery assembly as claimed in claim 25, characterised in that the recess (54) has a counter-toothing (58) for creating a catching connection.

27. Power train battery assembly as claimed in claim 26, characterised in that the counter-toothing (58) is an elastic clip.

\* \* \* \* \*

UNITED STATES PATENT AND TRADEMARK OFFICE
CERTIFICATE OF CORRECTION

PATENT NO.        : 8,722,229 B2
APPLICATION NO.   : 12/370664
DATED             : May 13, 2014
INVENTOR(S)       : Haussmann Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 922 days.

Signed and Sealed this
Twenty-eighth Day of July, 2015

Michelle K. Lee
*Director of the United States Patent and Trademark Office*